United States Patent
Dalstra

(10) Patent No.: US 12,482,087 B2
(45) Date of Patent: Nov. 25, 2025

(54) METHOD FOR INSPECTING HOLLOW GLASS PRODUCTS OF GLASS PRODUCT MATERIAL

(71) Applicant: Centrum voor Technische Informatica B.V., Groningen (NL)

(72) Inventor: Joop Dalstra, Noordlaren (NL)

(73) Assignee: Centrum voor Technische Informatica B.V., Groningen (NL)

(*) Notice: Subject to any disclaimer, the term of this patent is extended or adjusted under 35 U.S.C. 154(b) by 342 days.

(21) Appl. No.: 18/252,403

(22) PCT Filed: Nov. 11, 2021

(86) PCT No.: PCT/NL2021/050696
§ 371 (c)(1),
(2) Date: May 10, 2023

(87) PCT Pub. No.: WO2022/103265
PCT Pub. Date: May 19, 2022

(65) Prior Publication Data
US 2024/0029231 A1    Jan. 25, 2024

(30) Foreign Application Priority Data
Nov. 11, 2020   (NL) ................................. 2026864

(51) Int. Cl.
*G06K 9/00*    (2022.01)
*C03B 9/41*    (2006.01)
*G06T 7/00*    (2017.01)

(52) U.S. Cl.
CPC .............. *G06T 7/0004* (2013.01); *C03B 9/41* (2013.01); *G06T 2207/10048* (2013.01); *G06T 2207/30116* (2013.01)

(58) Field of Classification Search
CPC ......... G06T 7/0004; G06T 2207/10048; G06T 2207/30116; G06T 7/0002; G06T 7/0006;
(Continued)

(56) References Cited

U.S. PATENT DOCUMENTS 9,803,974 B2   10/2017   Bathelet
12,123,710 B2   10/2024   Pörtner
(Continued)

FOREIGN PATENT DOCUMENTS

DE   102019005487 B3   7/2020
EP   0643297 A1   3/1995
(Continued)

OTHER PUBLICATIONS

International Search Report and Written Opinion mailed Feb. 7, 2022, in connection with International Patent Application No. PCT/NL2021/050696, 11 pgs.
(Continued)

*Primary Examiner* — Avinash Yentrapati
(74) *Attorney, Agent, or Firm* — Chiesa Shahinian & Giantomasi PC

(57) ABSTRACT

Method and system for inspecting hollow glass products of glass product material, wherein the glass products are manufactured by: a. heating the glass product material; b. forming the heated glass product material into a glass product; c. cooling the formed glass product; wherein inspecting the glass products comprises the following steps: d. making a plurality of images of the glass product under a plurality of mutually different viewing directions relative to the product with the aid of a plurality of infrared light sensitive sensors, wherein step d. is carried out between steps b. and c.; e. processing in combination of the plurality of images for obtaining at least one parameter that depends on a wall thickness of the glass product.

34 Claims, 5 Drawing Sheets

(58) Field of Classification Search
CPC .................. G06T 7/0008; G06T 7/001; G06T 2207/30108; C03B 9/41; C03B 25/06; G01N 2021/888; G01N 2021/8883; G01N 2021/8887; G01B 11/06; G01B 21/085
See application file for complete search history.

(56) References Cited

U.S. PATENT DOCUMENTS

| | | | |
|---|---|---|---|
| 2011/0141265 | A1 | 6/2011 | Holtkamp et al. |
| 2015/0076353 | A1 | 3/2015 | Bathelet |
| 2019/0195619 | A1* | 6/2019 | Kress .................. G01N 25/72 |
| 2020/0299169 | A1* | 9/2020 | Cosneau .................. C03B 9/41 |
| 2022/0244039 | A1 | 8/2022 | Leconte et al. |

FOREIGN PATENT DOCUMENTS

| | | | | |
|---|---|---|---|---|
| EP | | 1020703 | A2 | 7/2000 |
| EP | | 1020703 | B1 | 3/2009 |
| EP | | 2743689 | A1 | 6/2014 |
| EP | | 3239697 | A1 | 11/2017 |
| FR | | 2988846 | A1 | 10/2013 |
| FR | | 2988946 | A1 | 10/2013 |
| WO | | 2010063953 | A1 | 6/2010 |
| WO | WO-2019133504 | A1 * | 7/2019 | ............ G01N 25/72 |
| WO | | 2021/009456 | A1 | 1/2021 |

OTHER PUBLICATIONS

Epstein, "Introduction to the Mathematics of Medical Imaging", 2nd Edition, Chapter 3, 2007, SIAM (Society for Industrial and Applied Mathematics), 39 pgs.

Epstein, "Introduction to the Mathematics of Medical Imaging", 2nd Edition, Chapter 11, 2007, SIAM (Society for Industrial and Applied Mathematics), 50 pgs.

Epstein, "Introduction to the Mathematics of Medical Imaging", 2nd Edition, Chapter 13, 2007, SIAM (Society for Industrial and Applied Mathematics), 17 pgs.

Peyrin et al., "Introduction to 2D and 3D tomographic imaging based on straight-line propagation. Cases of X-ray, emission and ultrasound tomography," 2019, HAL, https://hal.science/hal-02160388v1, 34 pgs (translation of Abstract included within the document).

* cited by examiner

METHOD FOR INSPECTING HOLLOW GLASS PRODUCTS OF GLASS PRODUCT MATERIAL

CROSS-REFERENCE TO RELATED APPLICATION(S)

This application is a National Stage under 35 U.S.C. 371 of International Patent Application No. PCT/NL2021/050696, filed Nov. 11, 2021, which claims priority to the Netherlands Patent Application No. 2026864, filed Nov. 11, 2020; the disclosures of all of which are incorporated herein by reference in their entireties.

The invention relates to a method for inspecting hollow glass products of glass product material, wherein the glass products are manufactured by:
a. heating the glass product material;
b. forming the heated glass product material into a glass product in a production flow;
c. cooling the formed glass product;
wherein inspecting the glass products comprises the following steps:
d. making a plurality of images of the glass product under a plurality of mutually different viewing directions relative to the product using a plurality of infrared light sensitive sensors, wherein step d. is carried out between steps b. and c.;
e. processing in combination of the plurality of images for obtaining at least one parameter that depends on a wall thickness of the glass product.

The invention further relates to a method for producing and inspecting hollow glass products of glass product material, wherein the glass products are manufactured by:
a. heating the glass product material;
b. forming the heated glass product material into a glass product in a production flow;
c. cooling the formed glass product; wherein inspecting the glass products comprises the following steps:
d. making a plurality of images of the glass product under a plurality of mutually different viewing directions relative to the product using a plurality of infrared light sensitive sensors, wherein step d. is carried out between steps b. and c.;
e. processing in combination of the plurality of images for obtaining at least one parameter which depends on a wall thickness of the glass product.

Also, the invention relates to a system for producing and inspecting glass products of glass product material according to the above-mentioned method, wherein the system comprises:
a heating apparatus for carrying out step a.;
a product forming apparatus such as a mould for carrying out step b.;
a cooling apparatus for carrying out step c.;
the plurality of the sensors for carrying out step d.; and
a processing unit connected with each of the sensors for processing signals coming from the sensors, the signals each representing an image obtained with one of the sensors, wherein the processing unit is configured for processing in combination of the plurality of images for obtaining at least one parameter which depends on a wall thickness of the glass product.

In addition, the invention relates to a system for inspecting glass products of glass product material according to the above-mentioned method, wherein the system comprises:
the plurality of the sensors for carrying out step d.; and
a signal processing unit connected with each of the sensors for processing signals coming from the sensors, the signals each representing an image obtained with one of the sensors, wherein the processing unit is configured for processing in combination of the plurality of images for obtaining at least one parameter which depends on a wall thickness of the glass product.

Such methods and systems are known per se, for instance from WO-2019133504A1. In the known method, using a plurality of sensors, images of the still-hot just-manufactured glass products are made. Due to the sensors being set up around the glass product, with the images a full revolution of the product is covered. The making of such a group of images is carried out repeatedly at different points of time. On each of the images, the intensity of the infrared radiation is visible. By comparing two images made at different points of time of a same part of the product, a decrease of the intensity can be established. If the intensity decreases relatively slowly, it is established that the glass material at that spot is relatively thick. If the intensity decreases relatively fast, it is established that the glass material at that spot is relatively thin. In this manner, a lateral glass thickness distribution of the glass product can be determined. A disadvantage is that this method is relatively inaccurate.

This just-mentioned lateral glass thickness distribution, also referred to by the abbreviation LGD (Lateral Glass Distribution), at a particular height is the set of the wall thicknesses around the circumference of the product (FIG. 5). This LGD can for instance be obtained by measuring glass wall thicknesses at a particular height h and performing the thickness measurements around the whole circumference of the product. All wall thicknesses of the whole product are the Total Lateral Glass Distribution of the product. A single wall thickness of the product at a defined height h and angle phi (polar coordinates) is an element of the set of wall thicknesses: Lateral Glass Distribution LGD (h,phi). The number of elements in the LGD depends on the, freely to be chosen, measuring resolution of the height and the angle.

The LGD is a very important parameter for the quality of the glass product. The strength of the product is chiefly determined by the thinnest part of a glass wall. In order to prevent breakage in the normal use of the product, the LGD must comply with the specifications of a producer. However, with the current glass production technology, the variation of the Lateral Glass Distribution can range from 35% to 55% of the average glass wall thickness. To arrange for the product to be yet sufficiently strong (minimal reject), this glass thickness variation is compensated for by making the glass wall of extra thick design. As a result, not only does the product become heavier (more glass), but also more base materials are used, it takes more energy to produce the product (melting and annealing) and the transport costs of the glass product become higher due to the extra weight. By minimizing the variation of the lateral glass thickness distribution of the product, the design of the product can be adjusted to have a thinner (more constant) glass wall thickness. The product becomes lighter, the production costs fall proportionally, and so do the transport costs (as well as the $CO_2$, $NO_x$ emissions depending thereon).

To minimize the variation in the lateral glass thickness distribution in the industrial glass forming process, a sensor that is able to determine the LGD in the glass forming process is requisite. Using this sensor, in the production process the root causes of the variation of the LGD can be investigated, for instance by ascertaining which process settings or parts of the process are responsible for an unduly large variation in the LGD. When these causes of the variation of the LGD are known, the responsible process steps can be improved, for instance by optimizing the setting by using the measuring data of the sensor. This may also be done automatically with a feedback system (FeedBack loop) to automate the optimum settings so as to obtain a minimal variation of the LGD. Also, improvements may be incorporated in the responsible process steps, to minimize the variation of the LGD.

Object of the invention is to improve the known inspection process and possibly, on the basis of the improved inspection process, to improve the production process.

The method according to the invention is characterised in that the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite the side, that faces away from the sensor with which the image has been made, wherein the plurality of images cover a first area of the glass product that extends around an axial axis of the product and wherein in step e. the plurality of images are processed in combination according to the principle of tomography for obtaining a lateral glass thickness distribution of the glass that is in the area. Transparent is here understood to mean sufficiently transparent so that an image of the plurality of images both shows a side of the glass product that faces the sensor with which the image has been made and shows a side of the glass product, located opposite the side, that faces away from the sensor with which the image has been made. The camera can hence see through the product, but does see the inner and outer surfaces of the product. It holds that each sensor is sensitive to light in the spectrum to which the glass is transparent, more particularly that the sensor is sensitive to light having a bandwidth of 900 nm-3500 nm, still more particularly that the sensor is sensitive to light having a bandwidth of 900 nm-1900 nm.

The invention is based on the insight that in an image, by detection of infrared light to which the hollow glass product is transparent, both a side of the glass product is shown that faces the sensor and a side of the glass product, located opposite the side, that faces away from the sensor.

On first thoughts, this would seem to be disadvantageous because in that case an image is more difficult to interpret. Because the plurality of images are made, however, it is possible, according to the principle of tomography, to determine information that represents the glass thickness of the material. This information about the glass thickness can then be determined for at least the whole first area that extends around the glass product. With infrared radiation, thus, indirectly the glass thickness is determined. The amount of radiation depends on the temperature (distribution) of the glass and the thickness of the glass (also material properties). In an industrial process the temperature is mostly constant, so that the measurements can be calibrated. The sensor sees a combination of the front glass wall and the rear glass wall. By tomography, this front glass wall and rear glass wall as well as their surfaces can be distinctly detected.

On the basis of the glass thickness distribution it can be determined whether for instance a glass thickness distribution is within predetermined limits. If this is not the case, for instance the product may be rejected but it is also possible to adjust a parameter of the glass production process, such as for instance the temperature with which the glass product material is heated in step a. or the forming of the heated glass product material into the glass product in step b. In this forming, for instance moulds may be utilized. Adjusting (adapting) step b. may then for instance consist in replacing a mould with a new mould. Also, in step b. troughs may be utilized through which the glass product material flows towards a mould. Such troughs may, for instance upon an established deviation of a glass thickness distribution, be lubricated with a lubricant. Other adjustments (adaptations) are also possible, of course. These adjustments may then be carried out automatically. It is also possible, however, that some adjustments of step b. are carried out manually. In practice, glass products are typically produced parallel to each other in a plurality of moulds. According to the invention, per mould, for products that have been produced with that mould, the glass thickness distributions can then be determined. The glass thickness distributions of products that have been produced with another mould are then determined separately. If one of the moulds exhibits a deviation resulting in a deviation in glass thickness distribution, this can be established separately for that mould on the basis of a glass thickness distribution of a product that has been manufactured in that mould. Also a deviation in at least one trough supplying a glass gob in each case exclusively to one of the moulds, with such deviation resulting in a deviation in the glass thickness distribution of at least one product that has been produced from a glass gob that has flowed through the respective at least one trough, can be detected by detection of a deviation in the associated at least one glass thickness distribution. When deviations in troughs and/or moulds have thus been detected by detection of a deviation in at least one associated glass thickness distribution, these may be corrected, for instance automatically, for instance by readjusting a position and/or orientation of a trough with respect to a mould or providing a trough with a lubricant. Also, a mould may be replaced. It holds, thus, that in particular a plurality of the steps b. are carried out parallel to each other for producing parallel to each other a plurality of the products in a plurality of production flows which each comprise a step b., wherein each determined glass thickness distribution of a product is related to the production flow in which the respective product has been manufactured, more particularly wherein in an automatic manner a production flow is controlled on the basis of at least one glass thickness distribution of at least one product that has been manufactured in the respective product flow. Controlling of a production flow is here understood to mean controlling of hardware with the aid of which the product is manufactured in the production flow. Such controlling can consist in, for instance, setting a position and/or orientation of at least one trough and/or a mould, supplying a lubricant to the at least one trough and/or replacing a mould. In particular, the method is thus characterised in that a plurality of the steps b. are carried out parallel to each other for producing parallel to each other a plurality of the products in a plurality of production flows, wherein in each production flow a step b. is carried out, wherein each determined glass thickness distribution of a product is related to the production flow in which the respective product has been manufactured, more particularly wherein on the basis of a glass thickness distribution of a particular product the production flow is controlled (manually or automatically) on the basis of at least one glass thickness distribution of at least one product which has been manufactured in the respective product flow.

It holds, preferably, that the glass thickness distribution comprises absolute values of the glass thickness distribution.

It is also possible, however, that the glass thickness distribution solely indicates relative variations in glass thickness.

Further, it holds, preferably, that each image of the plurality of images both shows a side of the glass product that faces the at least one sensor with which the image has been made and shows a side of the glass product, located opposite the side, that faces away from the at least one sensor with which the image has been made. In this manner, step e. can be carried out particularly accurately. In particular, it holds, further, that steps d. and e. are carried out repeatedly for obtaining a lateral glass thickness distribution in a second area of the glass product that extends around an axial axis of the product, with the first and second area being staggered with respect to each other in the axial direction.

The first and second area may partly overlap, adjoin each other, or be apart from each other so that in the latter case between the first and second area is an area that is not covered by the first and second area. Characteristic of these areas is that the glass thickness distribution LGD (h.phi) for the first area can take values of h that cannot be taken in the glass thickness distribution of the second area, since the first and second area are staggered with respect to each other in axial direction. It holds, preferably, that the steps d. and e. are respectively carried out repeatedly at least three times for respectively obtaining lateral glass thickness distributions in respectively at least three mutually different areas which each extend around the axial axis and are staggered with respect to each other in axial direction and which preferably in combination cover, at least substantially, the whole glass product.

In this way, the glass thickness distribution of the whole product can be mapped. Also, it is possible that the first area covers the whole product.

The method for producing and inspecting hollow glass products is further characterised in that the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite the side, that faces away from the sensor with which the image has been made, wherein the plurality of images cover a first area of the glass product that extends around an axial axis of the product and wherein in step e. the plurality of images are processed in combination according to the principle of tomography for obtaining a lateral glass thickness distribution of the glass that is in the area.

The system for producing and inspecting glass products is further characterised in that the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite the side, that faces away from the sensor with which the image has been made, wherein the plurality of images cover a first area of the glass product that extends around an axial axis of the product and wherein the processing unit is further configured for carrying out step e. of the method according to the characterising portion of claim 1.

The system for inspecting glass products is further characterised in that the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite the side, that faces away from the sensor with which the image has been made, wherein the plurality of images cover a first area of the glass product that extends around an axial axis of the product and wherein the processing unit is further configured for carrying out step e. of the method according to the characterising portion of claim 1.

The invention will now be further explained on the basis of the drawing. In the drawing.

Figure 1:
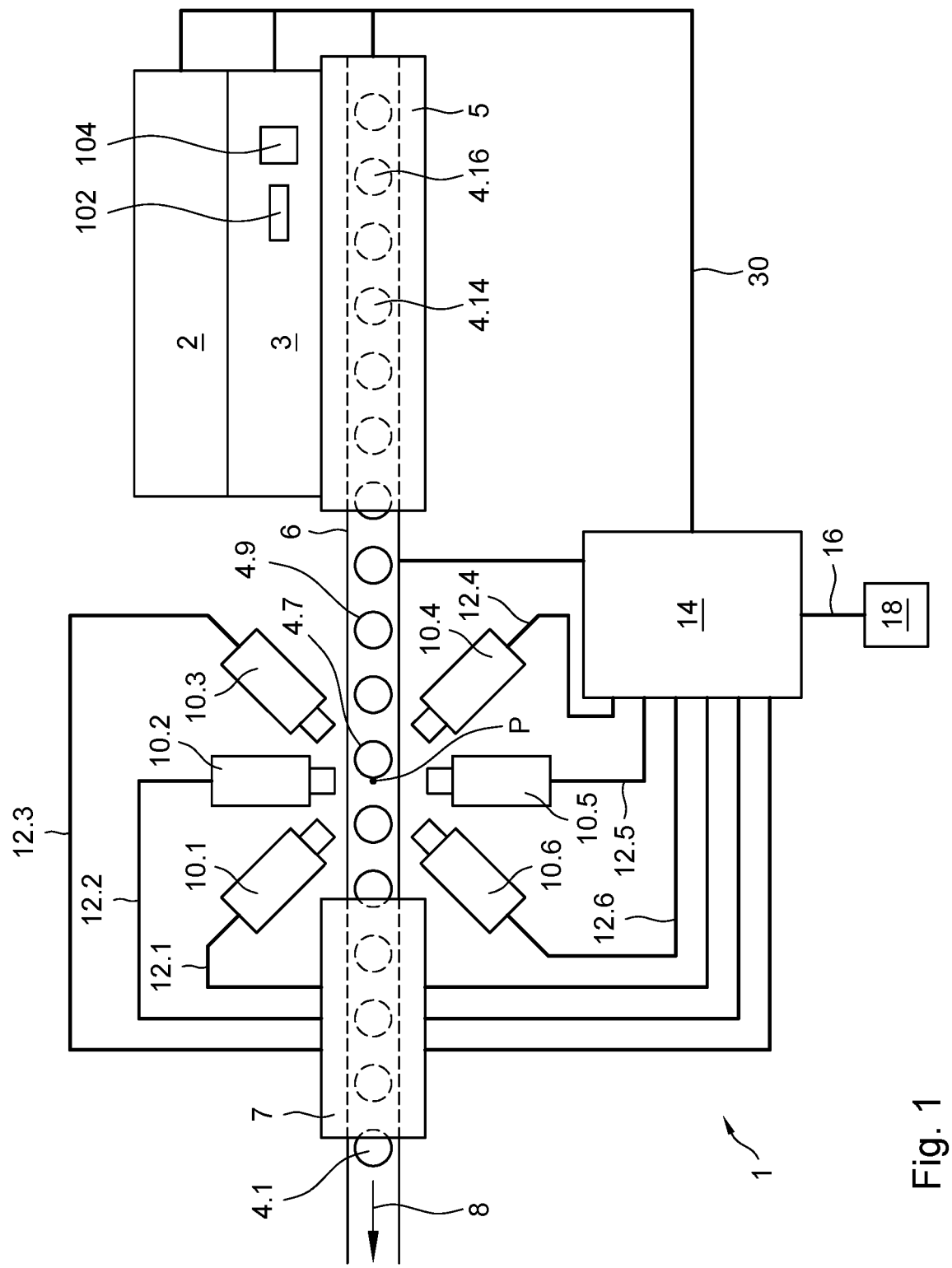
FIG. 1 shows a possible embodiment of a system according to the invention for carrying out a method according to the invention.

In FIG. 1 with reference numeral 1 a system according to the invention is indicated for carrying out a method according to the invention. The system comprises a schematically shown heating apparatus 2 for heating glass product material so that the glass product material enters a molten state. The molten material is transported to a product forming apparatus 3. In addition, other materials may be supplied to the product forming apparatus 3 if this is necessary, such as other materials and/or semimanufactures. In this embodiment, the product forming apparatus 3 manufactures in each case one hollow glass product 4.$i$ ($i$=1, 2, 3, . . . ) in a production flow. The glass product 4.$i$ is here manufactured after the glass product 4.$i$−1. The product forming apparatus 3 in this example includes for this purpose one mould, known per se, 104 (shown schematically in FIG. 1) into which a portion of the heated glass product material is introduced, and at least one trough 102 (shown schematically in FIG. 1) to guide a glass gob to the mould. Also, the product forming apparatus 3 comprises blowing means (not shown) for blowing or pushing the glass product material into the mould for obtaining the final shape of the glass product. While in this example the product forming apparatus comprises one mould, it is, of course, also possible that the product forming apparatus comprises a plurality of moulds for manufacturing parallel to each other a plurality of products in a plurality of parallel production flows. An example of this will, after the discussion of the variant with one mould, be discussed as well, with reference to a variant with six moulds.

The successively formed glass products 4.$i$ are placed with the aid of a placing unit 5 on a conveyor 6.

The glass products 4.$i$ produced as described above are transported with the aid of the conveyor 6 to a position P where inspection of a glass product can take place as will be set out hereinafter. Using the conveyor, the products are then transported further to a cooling apparatus for cooling of the glass product. With the arrow 8, the direction of transport of the conveyor is indicated.

Arranged around the position P, in this example, are six infrared cameras 10.$j$ ($j$=1, 2, 3, . . . , 6). The infrared cameras 10.$j$ are herein also referred to as sensors 10.$j$.

Via lines 12.$j$ which are respectively connected with the infrared cameras 10.$j$, signals of the infrared cameras are supplied to a signal processing unit 14. The signal processing unit 14 is connected via a line 16 with a display 18.

Figure 2:
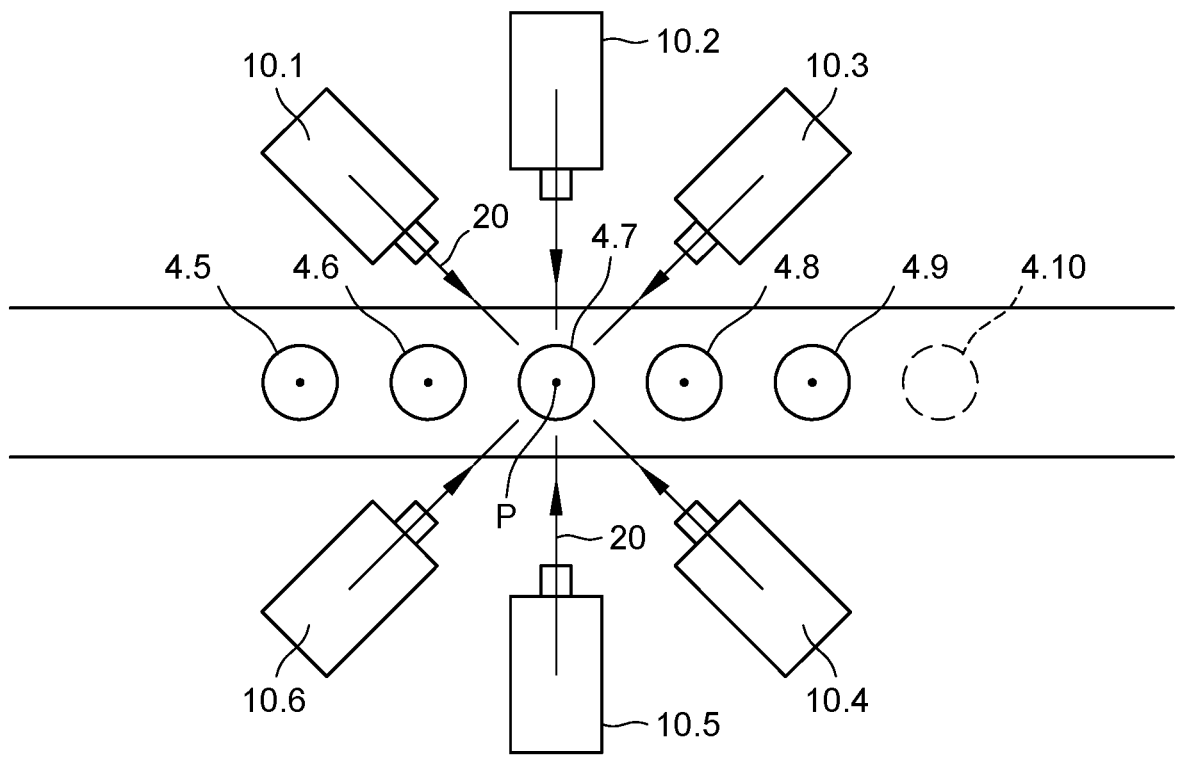
FIG. 2 shows the use of a part of the system of FIG. 1.
Figure 3:
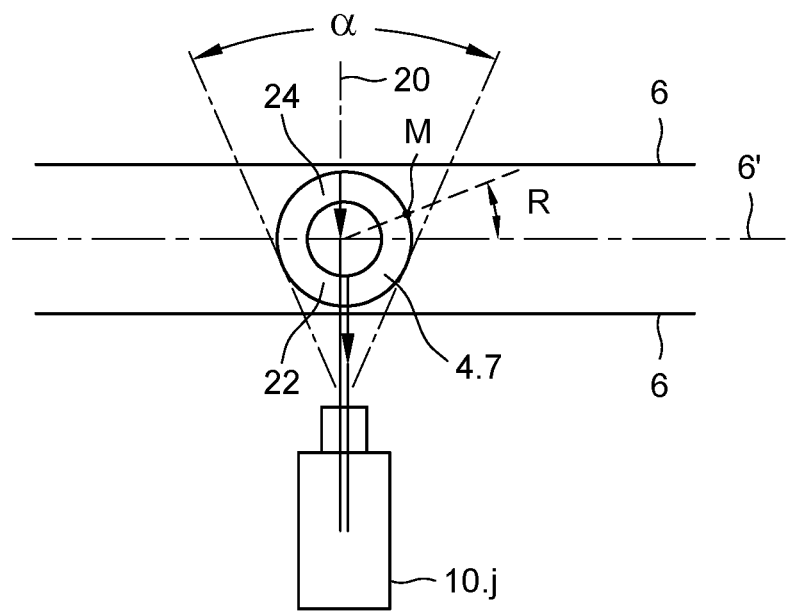
FIG. 3 shows a part of the use according to FIG. 2.
Figure 4:
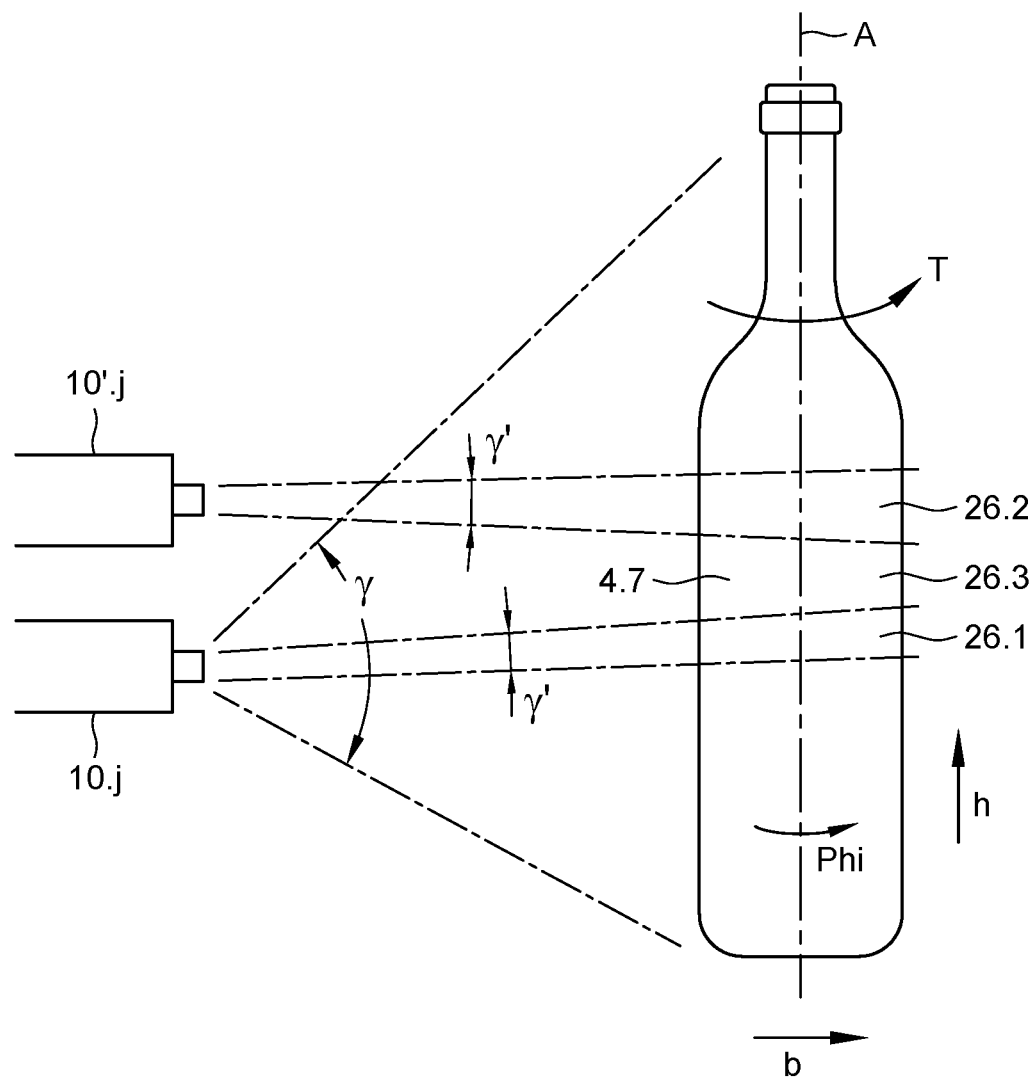
FIG. 4 shows a possible implementation of the glass product that is manufactured in the system of FIG. 1.
Figure 5:
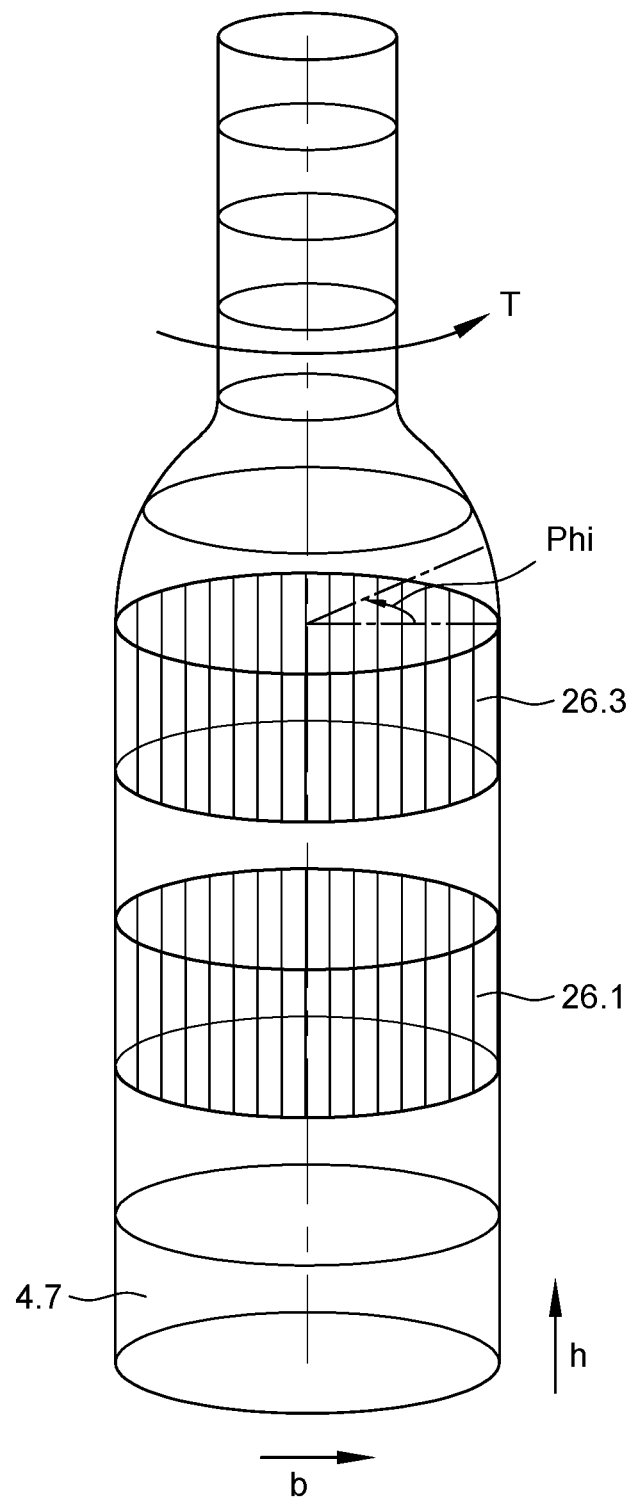
FIG. 5 shows schematically a 3D view of a glass product in which areas are hatched of which an LGD has been determined.

The working of the system according to the invention is as follows. In a step a., glass product material is heated with the heating unit 2. Then, in a step b., the heated and molten 'liquid' glass material is formed into a glass product. The glass products thus successively formed are placed with the aid of the placing unit 5 on the conveyor 6 for transport in the direction 8. The products, in this case, are bottles as shown in FIG. 4. The product 4.*i* is provided with an axial axis A which in this example is vertically directed. If a product which has been formed arrives at the position P, a situation as shown in FIG. 2 for the product 4.7 comes about. We assume that in this situation already 17 products have been formed where at some point the seventh formed product 4.7 is at the position P. Using the cameras 10.*j* a plurality of images of the glass product 4.7 are made under a plurality of mutually different viewing directions 20 relative to the product 4.7. The viewing directions 20 in this example are indicated with arrows 20. In this example, each camera has an aperture angle in a horizontal plane so that an image that is made with a camera covers the whole product in a horizontal direction. This is not requisite, however. In FIG. 3 the aperture angle concerned is indicated with a. However, the aperture angle α may for instance also be larger or be smaller than indicated. Viewed in vertical direction, the aperture angle γ (located in a vertical plane) of the camera is such that likewise the whole product 4.7 is covered (see FIG. 4). However, the angle γ may also be smaller or be larger than indicated.

It will be clear that making the plurality of images in step d. is carried out between the steps b. and c.

Each image that is made with an infrared camera 10.*j* is respectively supplied via a line 12.*j* to the signal processing unit 14. These signals are processed in combination in a step e. for obtaining at least one parameter that depends on a wall thickness of the glass product.

As mentioned, the sensors applied in step d. are sensitive to infrared light. In particular, the sensors are sensitive to infrared light having at least one frequency where the glass product is transparent to the infrared light. This has as a consequence that in an image made with an infrared camera both a side 22 of the glass product is visible that faces (is proximal to) the sensor (see FIG. 3) and the side 24 located opposite side 22, which faces away (is remote) from the infrared camera 10.*j*. For the side 24 is visible to the camera 10.*j* in FIG. 3 because the camera 10.*j* also "can see through the side 22". Transparent is here understood to mean sufficiently transparent so that an image of the plurality of images both shows a side of the glass product that faces the sensor with which the image has been made and shows a side of the glass product, located opposite the side, that faces away from the sensor with which the image has been made. So the camera can see through the product, but does see the inner and outer surfaces of the product.

Having regard to the aperture angle α, the image obtained with the aid of the camera 10.*j* covers the whole product in the direction phi (see FIG. 4), but it also holds, of course, that the plurality of images in combination cover a first area of the glass product that extends around an axial axis of the product. This first area, in this example, also covers the whole product seen in vertical direction. The images thus overlap each other in tangential direction T (see FIG. 4) of the product so that different images show a same part of the glass product. In this case, each camera covers the complete product, both in the axial direction (vertical direction) and in the tangential direction (horizontal direction) of the product. According to the invention, the signals from the infrared cameras 10.*j*, that is, the plurality of images which have been made are, according to the principle of tomography, processed in combination for obtaining a lateral glass thickness distribution of the product that is in the first area. In this case, the first area covers the complete product. The processing in combination of the images according to the principle of tomography can be carried out according to a computation technique which is known by the name of "filter back projection", A.R.T. or S.A.R.T. In this way, the lateral glass distribution LGD has been determined as a function of h and phi. The glass distribution LGD (h,phi) can be shown, via a line 16, on the display 18. In this way, an operator can keep an eye on the glass thickness distribution of the successively produced products 4.*i*. When the glass thickness distribution starts to deviate, for instance because the wall thickness of the product is becoming too large or too small at certain points, an intervention can be made in the production process, that is, an intervention can be made in the method step b. Such an intervention can be performed manually. However, it is also possible for such an intervention to be performed automatically, in this case via a feedback control line 30. All this is schematically indicated in FIG. 1.

It is noted that the aperture angle γ of each camera 10.*j* may also be smaller so that it has a value of for instance γ' (see FIG. 4). In that case, with the cameras 10.*j* a first area 26.1 is covered, the LGD of which is determined with the signal processing unit. In that case, using a second set of cameras which are each also provided with an aperture angle γ' and which are at a greater height h than the cameras 10.*j* and whose output signals are also supplied to the signal processing unit (not shown in the drawing), a glass thickness distribution of the second area 26.2 which extends around the product can be determined with the signal processing unit (see FIG. 4). The second area 26.2 is staggered in axial direction with respect to the area 26.1. Also, entirely analogously, it is possible that with the aid of a third set of six cameras (not shown) the lateral glass thickness distribution of an area 26.3 is determined. The areas 26.1, 26.2 and 26.3, for instance, adjoin each other then. It holds thus for the areas 26.1 and 26.2 that steps d. and e. are carried out repeatedly for obtaining a lateral glass distribution LGD in a second area of the glass product that extends around an axial axis of the product, with the first and second area being staggered with respect to each other in the axial direction.

In particular, it holds for the areas 26.1 to 26.3 that the steps d. and e., respectively, are carried out repeatedly at least three times for respectively obtaining lateral glass thickness distributions in respectively at least three mutually different areas which each extend around the axial axis and are staggered with respect to each other in axial direction and which preferably in combination cover, at least substantially, the whole glass product.

It holds preferably, however, that the aperture angle in vertical direction is so large that the respective area in which the glass thickness distribution is determined extends throughout the height of the product 4.*i* in the direction h. Further, it holds in this example that the aperture angle α of the cameras 10.*j* is such that each image shows the product, seen in its horizontal direction b (tangential direction), completely. However, the aperture angle may also be smaller than shown. In that case, on the other hand, the images, seen in horizontal direction, then overlap each other partly so that different images show a same part of the product. This is a minimal condition to be able to make use of the principle of tomography.

Further, it holds in this example that with the aid of the signal processing unit 14, from the images that are made with the cameras the rotational position R of the glass product around its axial axis on the conveyor is determined. This may for instance be done by detecting where a marking and/or a seam and/or a dot M of the glass product is. The rotational position R may then for instance be an angle R with respect to a centerline 6' of the conveyor 6 (see FIG. 3). For when the glass product is manufactured, it may beforehand be provided with a marking such as a dot or a seam. When with the aid of the placing means 5 the glass product is being placed on a conveyor, knowledge about the rotational position of the product is lost because during placement the product can turn about its axial axis. This has as a consequence that when a deviation is found in the glass thickness of the product, it may be disadvantageous when it is not known where this deviation is with respect to the marking. When it is known, it can, in certain instances, be determined better where in the product forming apparatus the problem of the deviation is caused. That is why preferably also the rotational position of the glass product around its axial axis is determined. Preferably, it holds that the cameras are set up around a position P, with the axial axis of a product to be inspected being also at position P when the recordings are being made. The viewing direction of the camera thus coincides with the point P. The cameras are thus preferably set up such that an optical axis 20 (see FIG. 3) of the sensors, at least substantially, crosses the axial axis of the glass product so that, in particular, in step e.'s processing in combination of the plurality of images according to the principle of tomography for obtaining the lateral glass distribution of the glass which is at least in the first area, per sensor only IR light is used that, relative to a respective sensor, comes substantially from the direction of the axial axis of the glass product. In FIG. 1 two more cameras may be additionally placed at positions higher than an upper side of the glass products on the conveying plant 6 and above the conveying plant and with their optical axes directed obliquely down to the position P. The cameras are then on both sides of the position P so that, seen from above, all cameras are set up regularly distributed along a fictitious circle.

In this example, it holds that the infrared cameras are sensitive to light in the spectrum for which the glass is transparent, more particularly that the sensor is sensitive to light having a bandwidth of 900 nm-3500 nm, still more particularly that the sensor is sensitive to light having a bandwidth of 900 nm-1900 nm.

In particular, it holds that, of a plurality of glass products successively formed in the production flow, per glass product a lateral glass thickness distribution is determined according to the steps d. and e., wherein from the determined glass thickness distributions an average glass thickness of the formed glass products is determined and/or wherein from the determined glass thickness distributions a trend in change in glass thickness distributions of successively formed glass products is determined.

If a trend is determined, it may for instance be inferred that a particular part, such as a mould, is wearing. Further, it holds in particular that in step e. for each of the products successively formed in the production flow the rotational position R is determined for comparing in each case the glass thickness distributions or glass thicknesses that relate to a partial area of an area, with the partial areas of the respective products having a same average rotational position.

In this way, for instance, a trend can be determined in particular predetermined locations of the products, such as for instance at a particular height h or within a particular range of h and a particular value of phi or within a particular range of phi. In particular, it holds furthermore that in the processing in combination of the plurality of images according to the principle of tomography for obtaining a lateral glass thickness distribution of the glass that is in the area, ray tracing is applied.

It is noted that the glass thickness distribution can comprise absolute values of the glass thickness distribution. It is also possible, however, that the glass thickness distribution indicates only relative variations in glass thickness.

The invention is not in any way limited to the embodiments outlined above. For instance, it is also possible that the cameras 10.j have an aperture angle γ' while the cameras 10.j, after making the images that are processed in combination for obtaining a glass thickness distribution in the area 26.1, are moved up in axial direction for obtaining six new images in order to obtain a glass thickness distribution in the area 26.2. After this, the cameras may be moved further up for making images of the area 26.3, etc. Further, it is clear that the cameras 10.j and the signal processing unit 14 can also be used in other production processes for forming glass products than described here. In fact, the cameras in combination with the signal processing unit 14 constitute an essential part of the invention. According to the invention, also, the cooling apparatus 7 could be omitted, since also without cooling apparatus 7 the products will eventually cool down as a matter of course so that step c. can also be carried out without extra aids. Also, the cooling apparatus may, whether manually or automatically, be controlled (for example, the temperature of the cooling apparatus) on the basis of the determined LGD.

In particular, it holds that the infrared camera is a so-called high-speed infrared camera. However, other infrared cameras are also possible.

Figure 6:
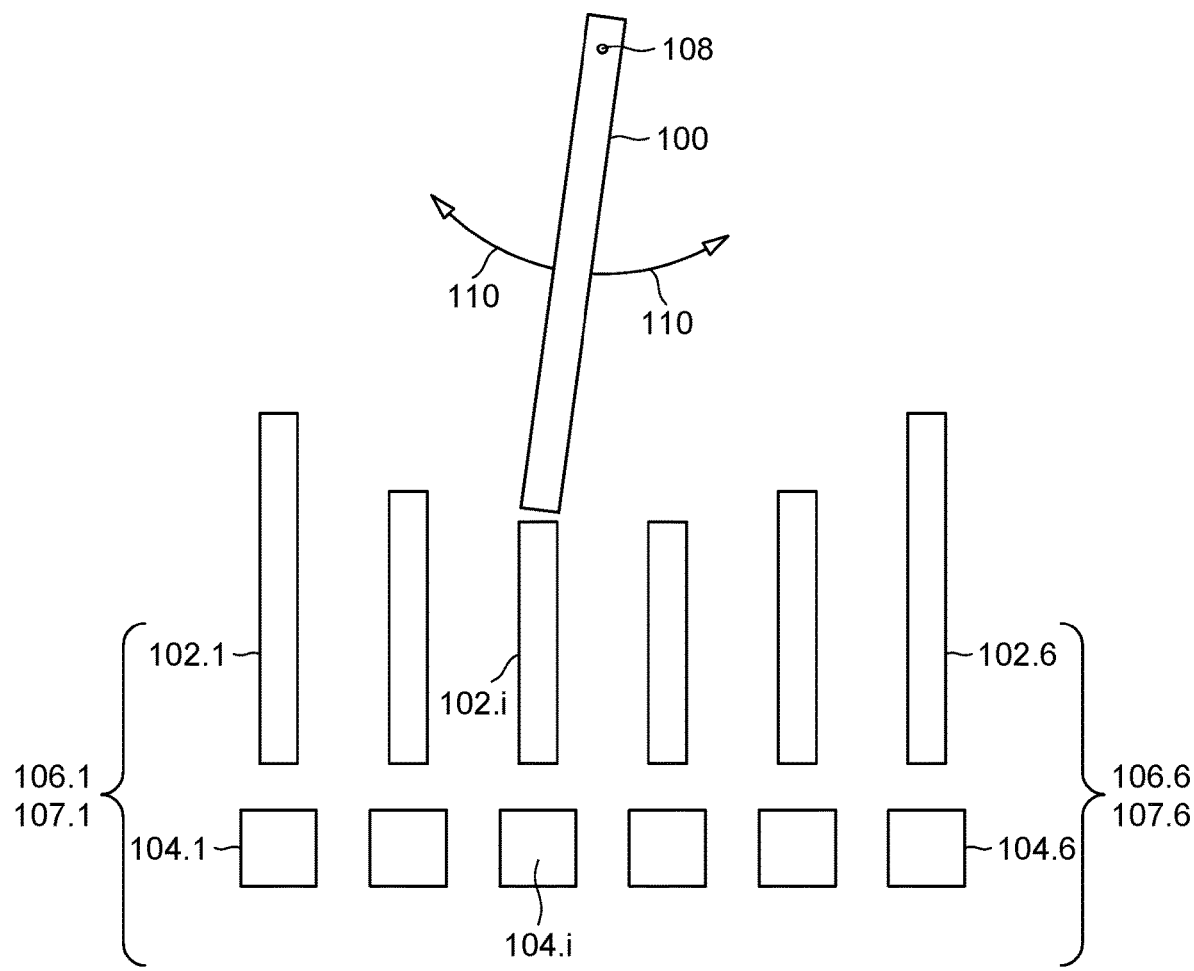
FIG. 6 shows schematically a top plan view of a possible embodiment of the product forming apparatus of FIG. 1.

According to an alternative embodiment, a plurality of products are formed parallel to each other. In the example of FIG. 6, six products are formed parallel to each other. To this end, the system, in this example the product forming apparatus 3, includes six production flow paths 106.k which, for instance, each comprise troughs and a mould. This is shown in FIG. 6 in which a formed glass gob is guided via a switch 100 to a production flow path 106.k (k=1, 2, 3, . . . 6) selected with the switch, each production flow path 106.k comprising a number of troughs 102.k and a mould 104.k. The glass gobs which are successively transported along the production flow path 106.k together form a production flow 107.k. By rotation of the switch in the direction of arrows 110 around an axis (pivot) 108, other production flow paths 106.k can be selected with the switch. The glass gob flows, in this example, via the selected at least one trough 102.k to the mould 104.k. In this example, for k, successively the values 1, 2, 3, 4, 5, 6 are selected by the switch 100. In this example, there are thus six parallel production flows.

Because there are six production flows, in succession six products 4.1, 4.2, 4.3, . . . 4.6 are formed which are placed in a row of six products on the conveyor. Here, product 4.1 has been formed from a glass gob which has been transported via production flow path 106.1 in production flow 107.1, product 4.2 formed from a glass gob which has been transported via production flow path 106.2 in production flow 107.2, product 4.3 formed from a glass gob which has been transported via production flow path 106.3 in production flow 107.3, etc. More generally, product 4.j has been formed from a glass gob which has been transported via production flow path 106.k in production flow 107.k, for k=1, 2, 3, 4, 5, 6. When thus six products have been produced, this process repeats itself.

Here, product 4.7 is formed from a glass gob which has been transported via production flow path 106.1 in production flow 107.1, product 4.8 is formed from a glass gob which has been transported via production flow path 106.2 in production flow 107.2, product 4.9 is formed from a glass gob which has been transported via production flow path 106.3 in production flow 107.3, etc. More generally, product 4.k+6 has been formed from a glass gob which has been transported via production flow path 106.k in production flow 107.k, for k=1, 2, 3, 4, 5, 6. When thus six products have been produced, this process repeats itself. Generally, therefore, it holds that product 4.k+n.6 with n=0, 1, 2, 3, . . . has been formed from a glass gob which has been transported via production flow path 106.k in production flow 107.k for k=1, 2, 3, 4, 5, 6.

In this example, for k, successively the value 1, 2, 3, 4, 5, 6 is chosen by the switch 100. The system is configured to determine the glass thickness distribution per product with the signal processing unit. Each determined glass thickness distribution of a product 4.i=k, 4.i=k+6, 4.i=k+12, etc., can be related by the signal processing unit to an associated production flow 107.k. If, for instance, in a product 4.i=k+18 a deviation in the associated glass distribution is established, the system (in this case the signal processing unit) is configured to relate this to the production flow path 106.k (and hence to the production flow 107.k) with which the respective product has been manufactured. This holds in general for a deviation in the glass distribution of product 4.i=k+n.6 with n=0 or 1 or 2 or 3 or . . . etc. Thus, in the case of such deviation, for instance in an automatic manner the position and/or orientation of the at least one trough 102.k and/or the mould 104.k of the production flow path 106.k with which the respective product has been manufactured can be readjusted and/or the at least one trough 102.k of the production flow path 106.k in which the respective product has been manufactured may be provided with a lubricant. Also, it is possible that the respective mould 104.k is replaced.

It holds thus that the system is configured for carrying out a plurality of the steps b. parallel to each other for producing parallel to each other a plurality of the products in a plurality of production flows which each comprise a step b., wherein the system is further configured for, in use, relating each determined glass thickness distribution of a product to the production flow in which the respective product has been manufactured, more particularly wherein the system is configured for, on the basis of at least one determined glass thickness distribution of a product that has been manufactured in a production flow, controlling that production flow in an automatic manner. To put it differently, a production flow can be automatically controlled on the basis of at least one glass thickness distribution of at least one product that has been manufactured in the respective production flow. It holds thus for the method in particular that a plurality of the steps b. are carried out parallel to each other for producing parallel to each other a plurality of the products in a plurality of production flows, wherein in each production flow a step b. is carried out, wherein each determined glass thickness distribution of a product is related to the production flow in which the respective product has been manufactured, more particularly wherein on the basis of a glass thickness distribution of a particular product the production flow is controlled (manually or automatically) on the basis of at least one glass thickness distribution of at least one product that has been manufactured in the respective production flow.

Finally, it is noted that automatic control loops via line 30 can comprise the adjusting (adapting) of:

Feeder temperature and temperature distribution
Gob temperature distribution
Gob forming process
Gob loading process
Mould cooling and residence time in the mould
Design of the parison and the preform moulds
Blowout process (B&B process)
Plunger press process (NNPB, PB process)
Plunger cooling process
Blowout process at the front
Shape and design of the blowing pipe
Optimal lubricating method and lubricant moulds
Optimal standing time determination of the moulds
Optimal timing setting of the I.S. machine (glass forming machine)
Optimal temperature settings of moulds and automatic control thereof
Optimal air pressure control of product blowout
Optimal air pressure control for making the parison
Active reheating for an optimal temperature distribution of the glass gobs for an optimal LGD Such variants each fall within the scope of the invention.

The invention claimed is:

1. A method for inspecting hollow glass products of glass product material, wherein the glass products are manufactured by:
  a. heating the glass product material;
  b. forming the heated glass product material into a glass product in a production flow;
  c. cooling the formed glass product;
  wherein inspecting the glass products comprises the following steps:
  d. making a plurality of images of the glass product under a plurality of mutually different viewing directions relative to the product using a plurality of infrared light sensitive sensors, wherein step d. is carried out between steps b. and c.;
  e. processing in combination of the plurality of images of the glass product for obtaining at least one parameter that depends on a wall thickness of the glass product, wherein the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite said side, that faces away from the sensor with which the image has been made, wherein the plurality of images in combination cover at least a first area of the glass product that extends around an axial axis of the product, wherein the images seen in a tangential direction of the product overlap each other so that different images show a same part of the glass product, and wherein in step e. the plurality of images are processed in combination according to a principle of tomography for obtaining a lateral glass thickness distribution of the glass that is at least in the first area.

2. The method of claim 1, wherein the glass thickness distribution indicates solely relative variations in glass thickness.

3. The method of claim 1, wherein the glass thickness distribution comprises absolute values of the glass thickness distribution.

4. The method of claim 1, wherein for calibrating step e. the steps d. and e. are carried out on a glass product having a known glass thickness distribution.

5. The method of claim 1, wherein each image of the plurality of images both shows a side of the glass product that faces the sensor with which the image has been made and shows a side of the glass product, located opposite said side, that faces away from the sensor with which the image has been made.

6. The method of claim 1, wherein the sensors are each set up such that a first optical axis of the sensors at least substantially crosses the axial axis of the glass product so that in particular in step e.'s processing in combination of the plurality of images according to the principle of tomography for obtaining the lateral glass thickness distribution of the glass that is at least in the first area, per sensor only infrared light is used that, relative to a respective sensor, substantially comes from the direction of the axial axis of the glass product.

7. The method of claim 1, wherein the processing in combination according to a principle of tomography comprises a computation technique according to (Filtered) Back Projection, algebraic reconstruction technique (A.R.T) or simultaneous algebraic reconstruction technique (S.A.R.T).

8. The method of claim 6, wherein the first area viewed in a direction of the axial axis of the glass product covers the glass product at least substantially wholly.

9. The method of claim 1, wherein steps d. and e. are carried out repeatedly for obtaining a lateral glass thickness distribution in a second area of the glass product that extends around the axial axis of the product, wherein the first area and the second area are staggered with respect to each other in the axial direction.

10. The method of claim 9, wherein the steps d. and e. are respectively carried out repeatedly at least three times for respectively obtaining lateral glass thickness distributions in respectively at least three mutually different areas that each extend around the axial axis and are staggered with respect to each other in axial direction and which preferably in combination cover at least substantially the whole glass product.

11. The method of claim 1, wherein the axial axis is at least substantially vertically directed.

12. The method of claim 1, wherein the glass product between steps b. and c. is transported on a conveyor.

13. The method of claim 12, the glass product between steps b. and c. is transported on the conveyor from a product forming mold in which the glass product has been formed in step b. to a cooling apparatus in which the product is cooled in step c.

14. The method of claim 12, wherein a rotational position of the glass product around its axial axis on the conveyor is determined.

15. The method of claim 14, wherein a rotational position is determined with aid of at least one of the sensors by recognizing a predetermined marking on or in the glass product.

16. The method of claim 15, wherein the marking is a seam and/or a dot.

17. The method of claim 14, wherein inspecting also comprises a controlling whereby at least one step of the steps a., b. and c. is adjusted on the basis of at least one determined glass thickness distribution and associated determined rotational position.

18. The method of claim 1, wherein the sensors are set up around a common position and lie at least substantially in a common horizontal plane.

19. The method of claim 18, wherein the glass product to be inspected is at the position when with the sensors recordings of the glass product are made.

20. The method of claim 9, wherein the sensors are displaced in the axial direction for obtaining recordings in the different areas.

21. The method of claim 1, wherein each sensor comprises an IR camera.

22. The method of claim 1, wherein each sensor is sensitive to light in the spectrum having a bandwidth of 900nm-3500nm.

23. The method of claim 1, wherein, of a plurality of glass products successively formed in the production flow, per glass product a lateral glass thickness distribution is determined according to the steps d. and e., wherein from the determined glass thickness distributions an average glass thickness of the formed glass products is determined and/or wherein from the determined glass thickness distributions a trend in change in glass thickness distributions of successively formed glass products is determined.

24. The method of claim 14, wherein in step e. for each of the products successively formed in the production flow, the rotational position is determined for comparing in each case the glass thickness distributions or glass thicknesses that relate to a partial area of an area, wherein the partial areas of the respective products have a same average rotational position.

25. The method of claim 1, wherein in the processing in combination of the plurality of images according to the principle of tomography for obtaining a lateral glass thickness distribution of the glass that is in the area, ray tracing is used.

26. The method of claim 1, wherein a plurality of the steps b. are carried out parallel to each other for producing parallel to each other a plurality of the products in a plurality of production flows, wherein in each production flow a step b. is carried out, wherein each determined glass thickness distribution of a product is related to the production flow in which the respective product has been manufactured.

27. A method for producing and inspecting hollow glass products of glass product material, the method comprising:
   a. heating the glass product material;
   b. forming the heated glass product material into a glass product in a production flow;
   c. cooling the formed glass product; wherein inspecting the glass products comprises the following steps:
   d. making a plurality of images of the glass product under a plurality of mutually different viewing directions relative to the product using a plurality of infrared light sensitive sensors, wherein step d. is carried out between steps b. and c.;
   e. processing in combination of the plurality of images for obtaining at least one parameter which depends on a wall thickness of the glass product, wherein the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite said side, that faces away from the sensor with which the image has been made, wherein the plurality of images in combination cover at least a first area of the glass product that extends around an axial axis of the product, wherein the images seen in a tangential direction of the product overlap each other so that different images show a same part of the glass product, and wherein in step e. the plurality of images are processed in combination according to a principle of tomography for obtaining a lateral glass thickness distribution of the glass that is at least in the first area.

28. The method of claim 27, wherein a plurality of the steps b. are carried out parallel to each other for producing parallel to each other a plurality of the products in a plurality of production flows, wherein in each production flow a step b. is carried out, wherein each determined glass thickness distribution of a product is related to the production flow in which the respective product has been manufactured, more particularly wherein on the basis of a glass thickness distribution of a particular product the production flow is controlled on the basis of at least one glass thickness distribution of at least one product that has been manufactured in the respective production flow.

29. A system for producing and inspecting glass products of glass product material in accordance with the method of claim 1, wherein the system comprises:
- a heating apparatus for carrying out step a.;
- a product forming mold for carrying out step b.;
- a cooling apparatus for carrying out step c.;
- the plurality of the sensors for carrying out step d.; and
- a signal processing unit connected with each of the sensors for processing signals coming from the sensors, the signals each representing an image obtained with one of the sensors, wherein the processing unit is configured for processing in combination of the plurality of images for obtaining at least one parameter that depends on a wall thickness of the glass product, wherein the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite said side, that faces away from the sensor with which the image has been made, wherein the plurality of images cover a first area of the glass product that extends around an axial axis of the product and wherein the processing unit is further configured to process, in accordance to step e. of the method, the plurality of images in combination according to a principle of tomography for obtaining a lateral glass thickness distribution of the glass that is at least in the first area.

30. The system of claim 29, wherein the system further comprises a conveyor for carrying out the method according to claim 12.

31. The system of claim 29, wherein the system is configured for, on the basis of the determined glass thickness distribution, in an automatic manner, setting parameters of the heating apparatus, the product forming mold and/or the cooling apparatus.

32. The system of claim 29, wherein the system is configured for carrying out a plurality of the steps b. parallel to each other for producing parallel to each other a plurality of the products in a plurality of production flows which each comprise a step b., wherein the system is further configured for, in use, relating each determined glass thickness distribution of a product to the production flow in which the respective product has been manufactured, more particularly wherein the system is configured for, on the basis of a glass thickness distribution of a particular product, in an automatic manner, controlling the production flow on the basis of at least one glass thickness distribution of at least one product that has been manufactured in the respective production flow.

33. A system for inspecting glass products of glass product material according to the method of claim 1, wherein the system comprises:
- the plurality of the sensors for carrying out step d.; and
- a signal processing unit connected with each of the sensors for processing signals coming from the sensors, the signals each representing an image obtained with one of the sensors, wherein the processing unit is configured for processing in combination of the plurality of images for obtaining at least one parameter that depends on a wall thickness of the glass product, wherein the sensors used in step d. are sensitive to infrared light having at least one frequency where the glass product is transparent to the infrared light so that an image of the plurality of images both shows a side of the glass product that faces the sensor with which the image has been made and shows a side of the glass product, located opposite said side, that faces away from the sensor with which the image has been made, wherein the plurality of images cover a first area of the glass product that extends around an axial axis of the product, and that the processing unit is further configured to process, in accordance with step e. of the method, the plurality of images in combination according to a principle of tomography for obtaining a lateral glass thickness distribution of the glass that is at least in the first area.

34. The system of claim 33, wherein the system is configured for carrying out a plurality of the steps b. parallel to each other for producing parallel to each other a plurality of the products in a plurality of production flows which each comprise a step b., wherein the system is further configured for, in use, relating each determined glass thickness distribution of a product to the production flow in which the respective product has been manufactured.

* * * * *